United States Patent [19]

Eichinger

[11] 3,910,390

[45] Oct. 7, 1975

[54] SYNCHRONIZING DEVICE FOR GEAR COUPLINGS IN CHANGE-SPEED GEARS

[75] Inventor: Johann Eichinger, Putzbrunn, Germany

[73] Assignee: Carl Hurth, Maschinen- und Zahnradfabrik, Munich, Germany

[22] Filed: Mar. 18, 1974

[21] Appl. No.: 451,844

[30] Foreign Application Priority Data
Mar. 28, 1973  Germany............................ 2315388

[52] U.S. Cl. ............................. 192/53 E; 192/53 F
[51] Int. Cl.² ........................................ F16D 23/06
[58] Field of Search ...................... 192/53 E, 53 F

[56] References Cited
UNITED STATES PATENTS

| | | | |
|---|---|---|---|
| 3,078,975 | 2/1963 | Eaton | 192/53 E |
| 3,451,513 | 6/1969 | Altmann | 192/53 F |
| 3,692,163 | 9/1972 | Ruettinger | 192/53 F |
| 3,695,403 | 10/1972 | Eastwood | 192/53 E |
| 3,804,218 | 4/1974 | Krutashov | 192/53 E |

*Primary Examiner*—Allan D. Herrmann
*Attorney, Agent, or Firm*—Woodhams, Blanchard and Flynn

[57] ABSTRACT

Synchronizer for jaw tooth clutch means in change-speed gearing. In a cone-type synchronizer positioned between a pair of gears selectively connectible by jaw tooth clutches to a shaft it has been found that the axial length thereof can be shortened with adequate operational capacity maintained if the ratio between the maximum diameter (D) of the external cone bears to the axial distance (A) between the remote faces of the internal cone a ratio greater than the integer 3. Optimum operation is achieved if the ratio (D:A) is between 3.4 and 4.0.

4 Claims, 3 Drawing Figures

SYNCHRONIZING DEVICE FOR GEAR COUPLINGS IN CHANGE-SPEED GEARS

FIELD OF THE INVENTION

The invention relates to a synchronizing device for toothed clutches in change-speed gears, particularly for motor vehicles, in which there is provided between two gears which are supported rotatably on the same shaft and for the purpose of connecting said gears selectively to said shaft an axially movable clutch sleeve with which two friction cone rings, which are spaced apart by pins, can be coupled by longitudinal movement selectively to correspondingly conical synchronous rings, each thereof being continuously connected to the gears.

BACKGROUND OF THE INVENTION

Synchronizing devices of this type are already known in which the friction cone rings are spaced a relatively large distance from one another in relationship to their diameter. Same has up to now been considered as necessary in order to provide maximum guidance for the clutch sleeve, the length of which depends on the size of the friction surfaces of the synchronizing device. It being formerly believed that wear conditions required the friction surfaces to be of a given minimum size, synchronizing devices and thus also the clutches of the prior art are relatively large.

Therefore the basic purpose of the invention is to provide a synchronizing device of a shorter construction. Applicant's investigations have shown that the specific load can be increased beyond the degree previously believed acceptable without the wear condition being noticeably adversely affected. It also has been shown that the guide for the clutch sleeve can be reduced without affecting the operating reliability of the apparatus.

SUMMARY OF THE INVENTION

The basic purpose of the invention is attained by a synchronizing device which has between the maximum diameter of the external cone and the distance between the respectively remote end faces of the internal cone a ratio greater than the integer 3. Optimum conditions are achieved if said ratio is maintained between 3.4 and 4.0.

Further advantages and characteristics of the invention can be taken from the following description.

BRIEF DESCRIPTION OF THE DRAWINGS

The invention is discussed in connection with one exemplary embodiment which is illustrated in FIGS. 1 and 2.

In the drawings.

DETAILED DESCRIPTION

Figure 1:
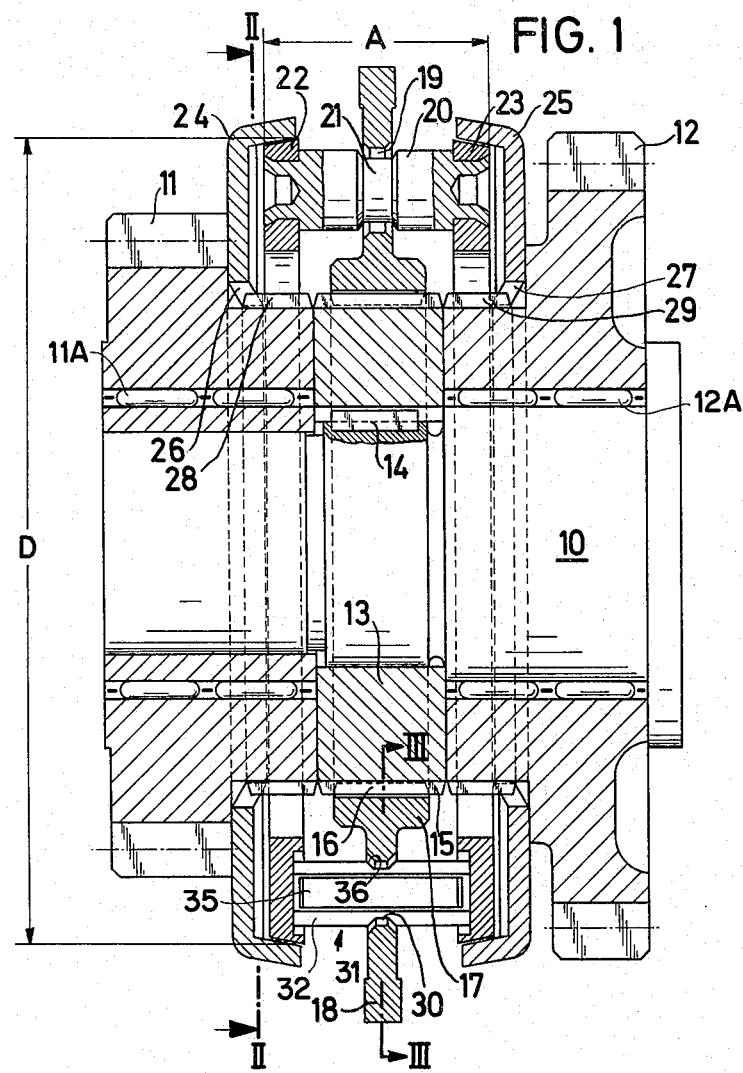
FIG. 1 is a longitudinal cross-sectional view of a synchronizing device according to the invention.
Figure 2:
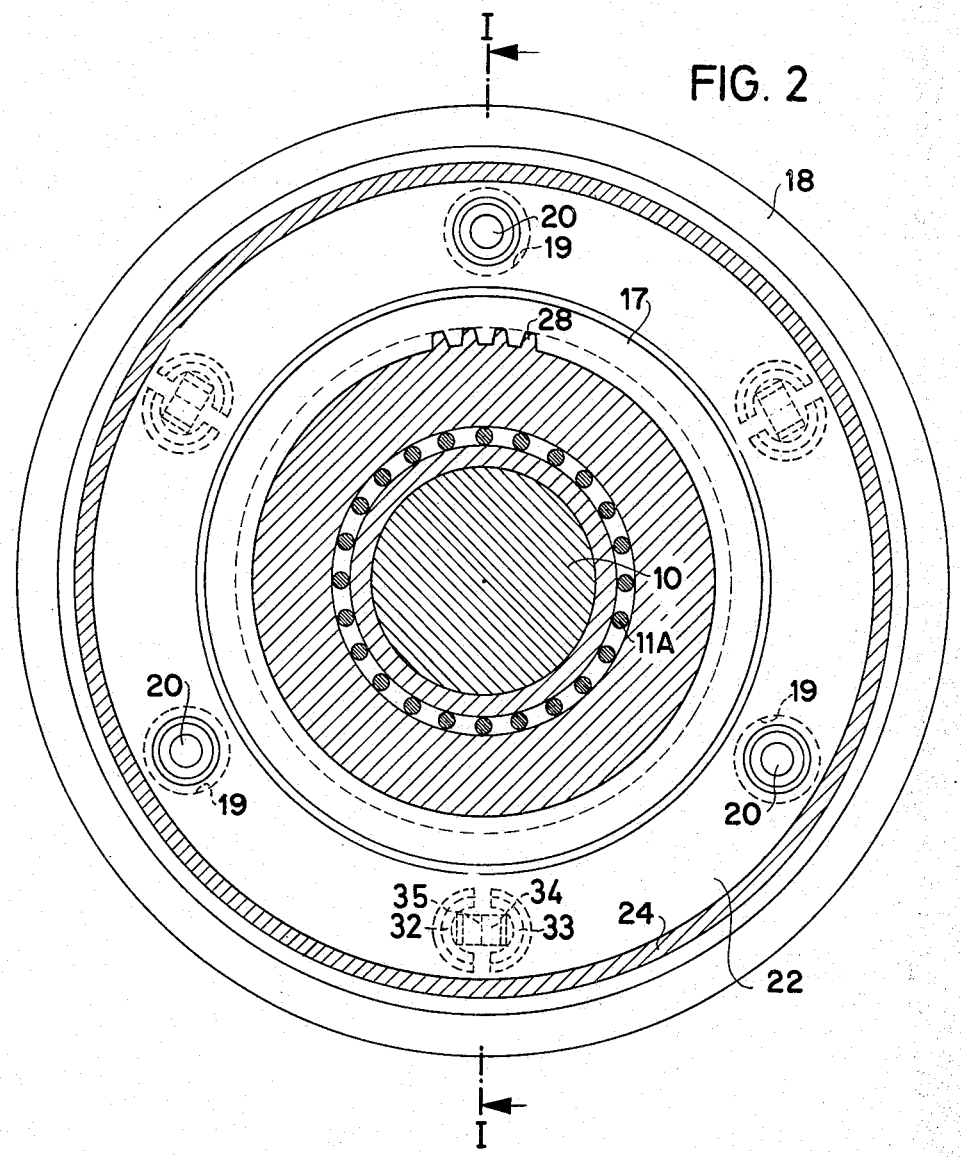
FIG. 2 is a cross-sectional view along the line II—II of FIG. 1.
Figure 3:
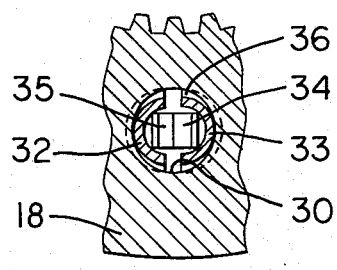
FIG. 3 is a sectional view taken along the line III—III of FIG. 1.

The synchronizing device is illustrated in FIG. 1 in its neutral position. Two gears 11, 12 are rotatably supported on, and with respect to, a shaft 10 by rollers 11a, 12a and are axially held by suitable means in a conventional manner. Between the gears a sleeve carrier 13, for example with a suitable key 14, is arranged fixedly with respect to rotation on the shaft. The sleeve carrier is provided with external annular splines 15 on which with internal splines 16 a coupling sleeve 17 is guided for longitudinal movement. Same is further provided with a flange 18 which is directed perpendicularly to the axis of the shaft 10. A ring of openings 19 is provided in the flange. Carrier pins 20 extend through a portion of said openings, which pins are provided in their center (the position of the flange in its neutral position) with an annular groove 21. The annular groove is slightly wider than the flange. A friction cone ring 22, 23 each is secured, for example riveted, to the ends of the pins. The remote axially facing surfaces on the friction cone rings are thus spaced from one another at a distance A. They are each provided with an external cone facing the gears, the largest outer diameter of which external cones is identified with the letter D. The external cones fit into internal cones which are formed by two synchronous rings 24, 25. The synchronous rings are centrally bored and are there provided with internal splines 26, 27 which each respectively engage external splines 28, 29 mounted on the gears 11, 12 and corresponding in shape to the aforementioned splines 15, 16. Further openings 30, for example three, are provided between the openings 19 through which pass the pins, into which openings 30 are placed conventional axially split expanding bolts 31. Said latter at each end thereof abut the friction cone rings. The expanding bolts consist of semicylindrical, cuplike halves 32, 33 which are pressed apart by leaf springs 34, 35 positioned between the semicylindrical halves and each have a semiannular groove 36 centrally located thereon. The internal diameter of the openings 30 is just slightly greater than the external diameter of the seimcylindrical halves 32, 33 (FIGS. 1 and 3).

OPERATION

The operation of such synchronizing devices will be understood by skilled artisans but the following description is being given for convenience.

The coupling sleeve 17 is shown in FIG. 1 as being in the center or neutral position and both of the gears 11 and 12 are disengaged. The synchronizier unit, defined by the pair of friction cone rings 22 and 23 coupled together by the carrier pins 20, is spaced from the synchronous rings 24 and 25 by a plurality of split extending bolts or split pin devices 31. The split pin devices 31 are each comprised of a pair of semicylindrical cuplike halves 32 and 33 which have a semiannular groove 36 therein adapted to recieve the internal diameter portion of the hole 30 through the flange 18 therein and as best illustrated in FIG. 3. When it is desired to couple the gear 11 with the externally splined sleeve carrier 13, the coupling sleeve 17 is urged to the left by a known and thus illustrated shifter fork. The external surface of the friction cone ring 22 engages the inner conical surface of the synchronous ring 24 and, as a result, the synchronous unit is circumferentially shifted relative to the flange 18 so that the carrier pins 20 move out of a concentric relationship relative to the holes 19. In other words, the internal diameter portion of the hole 19 is received in the annular groove 21 in the carrier pins 20. Thus, the flange 18 is locked out of a further movement to the left and the internal teeth of the coupling sleeve 17 cannot be coupled with the exterior teeth 28 on the gear 11. When synchronism occurs, the relative torque differential between the synchronous unit and the flange 18 diminishes and the force of the springs 34 and 35 is effective to again render the axis of the carrier pins 20 coaxial with the holes 19 in the flange 18. The cuplike halves 32 and 33 of the split pin devices 31 are then pressed together against the force of the springs 34 and 35 so that the annular groove 35 in the halves 32 and 33 become ineffective. Thus, the flange 18 can be moved to the left and the halves 32 and 33 of the split pin devices 31 will be flexed to facilitate a movement of the internal diameter portion of the hole 30 out of the annular groove 36 so that the internal teeth on the coupling sleeve 17 can be moved into engagement with the exterior teeth 28 on the gear 11. After the coupling sleeve 17 has completely moved to the leftmost position, the split pin devices 31 will separate on the right side of the flange 18 to prevent an inadvertent declutching of the coupling sleeve 17 from the teeth 28 on the gear 11. In order to declutch the coupling sleeve 17 from engagement with the gear 11, a reverse precedure is followed, namely first cancelling the spreading of the split pin devices 31 and thereafter moving the coupling sleeve 17 to the right. The annular groove 36 will not deter the movement of the coupling sleeve 17 toward the right.

The distance A between the opposite axially facing surfaces of the two friction cone rings and their largest diameter D are adjusted in such a manner to one another that the friction cone rings have a friction surface which is advantageous for a favorable wear condition and that thereby the coupling sleeve is sufficiently guided. This relationship D:A is advantageously greater than 3. Optimum conditions are obtained with a relationship D:A = 3.4 to 4, whereby the best value lies approximately at 3.6.

Although a particular preferred embodiment of the invention has been disclosed above for illustrative purposes, it will be understood that variations or modifications thereof which lie within the scope of the appended claims are fully contemplated.

The embodiments of the invention in which an exclusive property or privilege is claimed are defined as follows:

1. A synchronizing device for selectively connecting an intermediate rotatable member positively to either of a pair of rotatable members located respectively adjacent the ends of the intermediate member, comprising:
means for shifting the intermediate member into coupling engagment with either of said pair of rotatable members;
a pair of axially spaced synchronizer ring means responsive to said shifting means for producing synchronization of either of the said pair of rotatable members with the said intermediate member before engagement is made between them; and
additional means for rendering said synchronizer ring means effective when movement of said intermediate member is initiated from a neutral position, said additional means including (1) plural split pin devices extending between said pair of axially spaced synchronizer ring means, said plural split pin devices each including a centrally located annular groove therein, the edges of said annular groove being engaged by said shifting means when shifting is initiated from said neutral position and (2) solid pin devices extending between said pair of axially spaced synchronizer ring means, said solid pin devices including a centrally located annular groove therein, the edges of which are engaged by said shifting means when shifting is initiated from said neutral position, the ratio of the outer diameter (D) of said pair of synchronizer ring means to the axial spacing (A) between the oppositely axially facing sides of said pair of synchronizer ring means being greater than 3.

2. The synchronizing device according to claim 1, wherein the ratio (D:A) is between 3.4 and 4.0.

3. A synchronizing device for selectively connecting an intermediate rotatable member positively to either of a pair of rotatable members located respectively adjacent the ends of the intermediate member, comprising:
means for shifting the intermediate member into coupling engagement with either of said pair of rotatable members, said shifting means including a flange having a plurality of holes therein;
synchronizer means carried by the said flange for rotation therewith but movable axially relative thereto, said synchronizer means including a pair of axially spaced synchronizer rings located one adjacent each end of said shifting means and arranged to engage frictionally the respective adjacent rotatable member, said synchronizer rings being maintained in said axially spaced relation by a plurality of cylindrical carrier pins which are secured to and extend between said synchronizer rings, each of said cylindrical carrier pins having a first annular groove thereon slightly wider than said flange and centrally located between said synchronizer rings and extend through certain ones of said holes in said flange, said holes in said flange being concentric with said first annular groove when said shifting means is in a neutral position and the diameter of said holes is slightly greater than the cylindrical portion of said cylindrical carrier pins so that said flange can move into an encircling relation with said cylindrical portion;
a plurality of split pin devices extending between said pair of synchronizer rings, said plural split pin devices each including a centrally located second annular groove therein, the edges of said annular groove being engaged by at least a portion of the rim of each of certain others of said holes when shifting is initiated from said neutral position, said split pin devices including resilient means therebetween to urge said split pins into engagement with the interior surface of said certain others of said holes to bias said flange circumferentially toward a position wherein said certain ones of said holes are concentric with said cylindrical pins; and
a relationship of the outer diameter (D) of said synchronizer rings to the axial spacing (A) between the axially remote surfaces of said synchronizer rings being, greater than 3.

4. In combination, a pair of coaxially arranged rotatable gears located in axially spaced-apart relation, a rotatable coupling sleeve member coaxially located between said gears, said coupling sleeve member having a neutral range and being movable axially in either direction from said neutral range, means for clutching said coupling sleeve member and one of said gears together when said coupling sleeve member is moved to an extreme position in one direction, additional means for clutching said coupling sleeve member and said other gear together when said coupling sleeve member is moved to the extreme position in the other direction, means for providing for synchronization of each of said gears with said coupling sleeve member before the gear and coupling sleeve member are clutched together at an extreme position of said coupling sleeve member, said synchronization means comprising a flange portion on said coupling sleeve member having a plurality of apertures therethrough and a synchronizer structure carried by said flange portion for rotation therewith but movable axially relative thereto, said synchronizer structure including a pair of synchronizer rings located one adjacent each end of said coupling sleeve member and arranged to engage frictionally the respective adjacent gear, means for actuating said synchronizer structure axially and comprising split pin devices extending between said synchronizer rings through said apertures in said flange portion, said synchronizer actuating means including means defining an axially centrally located groove on said split pin devices adapted to be engaged by said flange portion when said flange portion is moved from said neutral range, such engagement occurring at a central position whereby when movement of said flange portion is initiated from said central position, said synchronizer actuating means is effective, and wherein a relationship of the outer diameter (D) of said synchronizer rings to the axial spacing (A) between the axially remote surfaces of said synchronizer rings is greater than 3.

* * * * *